Nov. 10, 1970  J. R. LUCEK  3,539,691
GLASS FURNACE WITH IMPROVED PARTIALLY IMMERSED ELECTRODE
Filed Oct. 30, 1968
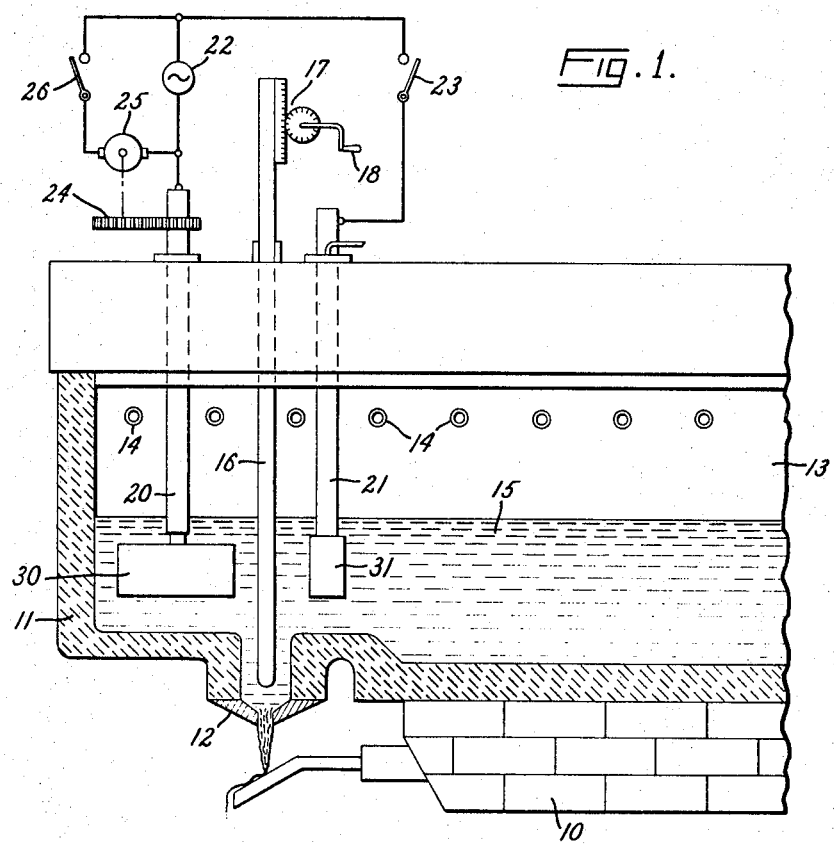
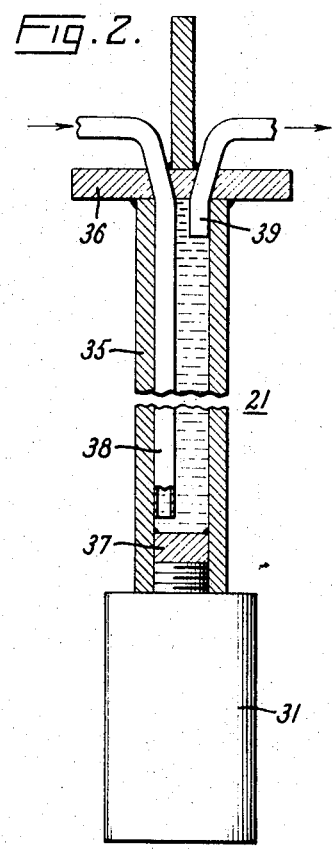
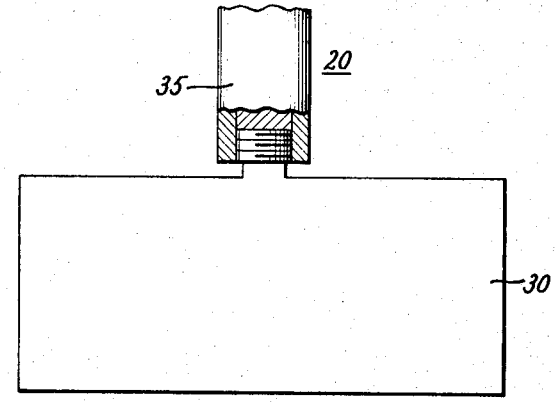
INVENTOR:
JOHN R. LUCEK.
BY J. Wesley Haubner
ATTORNEY United States Patent Office 3,539,691
Patented Nov. 10, 1970

3,539,691
GLASS FURNACE WITH IMPROVED PARTIALLY IMMERSED ELECTRODE
John R. Lucek, Pittsfield, Mass., assignor to General Electric Company, a corporation of New York
Filed Oct. 30, 1968, Ser. No. 771,776
Int. Cl. C03f 5/02
U.S. Cl. 13—6
5 Claims

ABSTRACT OF THE DISCLOSURE

A conductive electrode for glass-melting furnaces which is adapted to be mounted above and only partially immersed in a molten glass body. The improved electrode comprises an elongated shank or bus section of copper or steel adapted to be partially immersed in the molten glass and to extend into air above the glass surface. The immersed part of the shank is cooled, as by internally circulated fluid, to a temperature below the melting point of the glass and has removably attached thereto an uncooled tip or head formed preferably of molybdenum. The molybdenum head of the electrode may be shaped as a paddle, and the electrode rotated to stir the glass while heating.

My invention relates to glass melting furnaces having electric heating electrodes, and particularly to furnaces having electrodes mounted in air above the surface of molten glass and adapted for partial immersion in the glass. The invention is especially applicable to the forehearth chamber of a furnace wherein electrodes are positioned to furnish supplementary electric heat to glass adjacent the discharge orifice.

In the operation of glass-melting furnaces, the primary source of heat for melting the glass may be either a combustible fuel, as in gas jets above the glass surface, or an electric current conducted between electrodes extending into the glass body. In either case, it is generally desirable to supply supplementary heat to the body of molten glass in the region of the forehearth and adjacent the glass discharge orifice. Where current-conducting electrodes have been used to supply primary or supplemental heat, it is usual in existing electrode systems to mount the electrode in side or bottom walls of the furnace beneath the level of molten glass, so that the electrode remains at all times totally immersed in the glass body. This practice has been adopted because those few available materials not subject to rapid erosion when immersed in molten glass are subject to rapid oxidation when maintained at high temperature in air.

While totally immersed molybdenum electrodes operate satisfactorily after installation, considerable difficulty is encountered in maintenance of such electrodes. Special protective structures are required in the furnace wall adjacent the point of entry of the electrode. Principally, however, replacement of electrodes requires that the furnace be shut down and the contained body of molten glass drawn off to expose the electrode entry ports. Overhead electrodes are not subject to such maintenance difficulties, and in addition they may be movably mounted and utilized for stirring of glass simultaneously with the conduction of heating current therethrough.

Accordingly, it is a principal object of my invention to minimize maintenance and down time in the operation of glass furnaces, and particularly in the operation of the forehearth section of such furnaces.

It is a more particular object of my invention to provide an improved glass furnace having a current conductive electrode mounted in the forehearth chamber above the surface of the molten glass and with only a portion of the electrode adapted to extend beneath the surface of the glass.

In carrying out my invention in one preferred embodiment, I provide an electrode comprising a tubular shank or bus portion formed of copper and provided internally with passages for cooling fluid. The electrode is movably mounted in air above the surface of the glass with the lower end of the shank portion positioned beneath the glass surface at all times. At its lower end the shank is provided with a removable tip or head portion formed of molybdenum or the like, and preferably shaped as a radially extending paddle to stir the molten glass as the electrode is slowly rotated in its mounting.

My invention will be more fully understood and its various objects and advantages further appreciated by referring now to the following detailed specification taken in conjunction with the accompanying drawing in which:

FIG. 1 is a vertical cross-sectional view of a forehearth chamber of a typical glass-melting furnace, showing the discharge bowl provided with electrodes embodying my invention;

FIG. 2 is an enlarged axial cross-sectional view of an improved electrode embodying my invention, and FIG. 3 is a fragmentary view of the head end of an electrode similar to that of FIG. 2, but embodying a modified form of head.

Referring now to the drawing, I have shown at FIG. 1 a fragmentary cross-sectional view of a glass-melting furnace comprising particularly a forehearth chamber 10 terminating in a discharge bowl 11 having a conical discharge orifice 12 in the lower wall thereof. A typical glass-melting furnace having such a forehearth portion is shown, for example, in Pat. 1,889,516—McIntosh. As illustrated at FIG. 1, the forehearth comprises a trough or channel 13 connecting the discharge bowl 11 to the body of the furnace, and in both the channel and the bowl portions of the forehearth, heating means are provided for maintaining the glass in molten condition. At FIG. 1, I have illustrated schematically a group of gas jets 14 extending into the forehearth above the surface of the molten glass to supply primary heat to the forehearth. In the forehearth there is illustrated a body of molten glass 15 having its surface above the discharge orifice 12 and exposed to air in the upper region of the forehearth. Slidably mounted in the upper wall of the forehearth, I have shown a discharge control rod 16 having its lower end positioned adjacent the conical discharge orifice 12 for control of continuous or gob feeding of glass through the orifice. In order to adjust the control rod 16 longitudinally, there is illustrated schematically a rack and gear mechanism 17 actuated manually by a crank 18.

To supply supplementary heat to the glass body 15 in the immediate region of the discharge orifice 12, I have shown a pair of current conducting electrodes 20 and 21 mounted in the upper wall or top of the forehearth above the surface of the glass body 15 and extending beneath the surface of the glass to conduct current therebetween through the body of molten glass. The electrodes 20 and 21 are shown electrically connected to a source of electric current supply 22 through a control switch 23. The electrode 20 is shown rotatably mounted and connected through suitable gearing 24 to a driving motor 25. The motor 25 is illustrated as energized from the electric current supply source 22 through a control switch 26. For purposes of illustration I have shown the immersed end or head of the electrode 20 formed as a radially extended paddle 30, while the immersed head of the electrode 21 is shown as a substantially cylindrical extension or tip 31 of the shank portion of the electrode. It will, of course, be understood by those skilled in the are that, if desired, both electrodes may have their heads formed as stirring paddles or, alternatively, both may be non-rotatable with heads or tips of any desired configuration.

One or both electrodes 20, 21 may, if desired, be provided with laterally adjustable mounting means (not shown) to vary their positions in the body of molten glass. By varying the spacing of the electrodes, the magnitude of current may be controlled, thereby to maintain current or temperature constant, either by manual adjustment or under the control of suitable current-responsive or temperature-responsive regulating means.

As more fully illustrated at FIG. 2, the electrode 21 comprises an elongated tubular shank portion 35, preferably formed of copper, provided at its upper end with a mounting collar 36 and removably connected at its lower end to the immersed head or tip 31. The shank or bus portion 35 of the electrode 21 is adapted to be partially immersed in the molten glass body 15 at all times, and to extend above the surface of the glass body into air. The normally immersed lower end or head 31 of the electrode 21 is preferably formed of molybendum, but may also appropriately be formed of any other suitable material able to withstand the immersion in the molten glass without severe wear or erosion. Such material, for example, may be rhodium, platinum or graphite. As previously stated, the shank portion 35 of the electrode 21 is of tubular configuration.

The lower end of the electrode shank adjacent the head 31 is closed, as by a plug 37, and is provided throughout the remainder of its length with internal passages for the conduction of cooling fluid. As illustrated at FIG. 2, such passages are formed by a fluid inlet conduit 38 entering the hollow shank 35 at the upper end thereof and extending colinearly therewith for nearly the full length of the shank to the region of the lower plug 37. The fluid conduit 38 is spaced from the internal walls of the electrode shank 35, thereby to provide a passage ofr flow of cooling fluid between the shank wall and the internal conduit 38. An outlet conduit 39 is connected to the upper end of such fluid passage.

In operation of my improved heating electrode, the cooling fluid circulated through the conduits 38 and 39 and the intermediate fluid passage within the electrode shank 35 is so regulated that the shank portion of the electrode is maintained at an external surface temperature below the freezing point of the glass. Accordingly, there is formed on the immersed lower part of the shank 35 a protective coating of solid glass which precludes erosion of the shank by the adjacent molten glass. In one embodiment of the invention, which has been built and successfully operated, the immersed part of the electrode shank was maintained at a temperature of about 50° C. It will, of course, be understood by those skilled in the art that the head 31 of the electrode must be allowed to operate at or near the temperature of the molten glass so that no coating of frozen glass accumulates thereon. Molten glass is a good conductor of electricity, but solid glass is a very poor conductor and would impede the conduction of current from the electrode into the glass.

At FIG. 3, I have shown a fragmentary view of the lower portion of the electrode 20 of FIG. 1. The electrode comprises a shank or bus portion 35 of copper and a head portion 30 formed of molybdenum or other conductive metal substantially imperivous to erosion in molten glass. As illustrated also at FIG. 1, the removable head 30 of the electrode 20 is formed as a flat, radially extending paddle adapted to stir the molten glass body 15 when rotationally driven by the motor 25 (FIG. 1).

While I have shown and described certain preferred embodiments of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A glass-melting furnace comprising a chamber adapted to contain a body of molten glass having a predetermined minimum depth, means for supplying electric heating current to said glass body including a conductive electrode comprising an elongated shank formed of a conductive metal subject to rapid erosion in molten glass and a head affixed to one end of said shank, means mounting said electrode in said chamber above said glass body to maintain said head and a part of said shank immersed in said molten glass, said shank being provided with internal cooling ducts in at least the normally immersed part thereof, said head being formed of a conductive metal substantially impervious to erosion in molten glass, and cooling means, including said ducts, for maintaining at least the immersed part of said shank at a temperature below the melting point of said glass body.

2. A furnace according to claim 1 wherein the shank of said electrode is tubular and said cooling ducts include a fluid conduit extending through said shank for a major portion of its length and in space relation therewith, said tubular shank being closed at its ends and provided with a fluid port remote from the inner end of said conduit.

3. A furnace according to claim 1 wherein the head of said electrode is formed of a material selected from the class consisting of platinum, rhodium, molydenum and graphite and the shank of said electrode is formed of material selected from a class consisting of copper, cuprous alloys and ferrous alloys.

4. A furnace according to claim 1 wherein said head is formed of molydenum and said shank is formed of copper.

5. A furnace according to claim 1 wherein said head is formed as a paddle extending radially outward from the axis of said electrode and wherein means are provided for rotating said electrode about said axis to stir said glass body.

References Cited
UNITED STATES PATENTS

| | | | |
|---|---|---|---|
| 2,209,515 | 7/1940 | Ehman et al. | 13—18 |
| 2,859,261 | 11/1958 | Arbeit | 13—6 |
| 3,349,160 | 10/1967 | Rapson | 13—6 X |
| 3,388,204 | 6/1968 | Ellis | 13—6 X |
| 3,402,249 | 9/1968 | Blumenfeld et al. | 13—18 X |
| 3,412,194 | 11/1968 | Pipitz et al. | 13—18 X |

FOREIGN PATENTS

| | | |
|---|---|---|
| 984,225 | 3/1951 | France |
| 1,018,506 | 1/1953 | France |

BERNARD A. GILHEANY, Primary Examiner

R. N. ENVALL, JR., Assistant Examiner